United States Patent [19]

Fulkerson

[11] Patent Number: 5,628,536
[45] Date of Patent: May 13, 1997

[54] FASCIA FOR VEHICLE HITCHES

[75] Inventor: Gary E. Fulkerson, Auburn Hills, Mich.

[73] Assignee: Mascotech Automotive Systems Group, Inc., Auburn Hills, Mich.

[21] Appl. No.: 451,867

[22] Filed: May 26, 1995

[51] Int. Cl.⁶ .................................................. B60D 1/00
[52] U.S. Cl. ........................ 293/117; 293/120; 280/507
[58] Field of Search ................................. 293/117, 120; 280/507

[56] References Cited

U.S. PATENT DOCUMENTS

| | | |
|---|---|---|
| 2,151,920 | 3/1939 | Jandus et al. . |
| 2,525,964 | 10/1950 | Slaback . |
| 2,601,993 | 7/1952 | McCall . |
| 2,893,779 | 7/1959 | Bayley ................................. 293/117 X |
| 3,774,949 | 11/1973 | Eger ............................................ 293/117 |
| 3,774,952 | 11/1973 | Zorn ............................................ 293/117 |
| 3,866,949 | 2/1975 | Green ......................................... 280/507 |
| 4,109,930 | 8/1978 | Pilhall ................................... 293/117 X |
| 4,256,324 | 3/1981 | Hamilton . |
| 4,570,986 | 2/1986 | Sams . |
| 4,620,736 | 11/1986 | Shanks . |
| 4,838,593 | 6/1989 | Fleming et al. ..................... 293/120 X |
| 4,929,028 | 5/1990 | Underwood . |
| 5,094,469 | 3/1992 | Yamamoto et al. ................. 293/117 X |

*Primary Examiner*—Joseph D. Pape
*Attorney, Agent, or Firm*—Edgar A. Zarins; Malcolm L. Sutherland

[57] ABSTRACT

An aesthetically appealing fascia cover to conceal a trailer hitch mounted to the rear of a vehicle. The fascia cover is mounted to the vehicle frame associated with the bumper hanging below the bumper to conceal the hitch assembly. A hinged or removal door facilitates access to the hitch sleeve for attaching the hitch ball and the trailer. The fascia is designed to blend with the vehicle body and bumper to form an integrated component of the body styling.

18 Claims, 2 Drawing Sheets

FASCIA FOR VEHICLE HITCHES

BACKGROUND OF THE INVENTION

I. Field of the Invention

This invention relates to the concealment of trailer hitches mounted to the rear of a vehicle and, in particular, to a decorative fascia matching the vehicle body style and mountable to the rear of the vehicle proximate the bumper to enclose the bumper assembly while permitting access to the hitch for connecting a trailer.

II. Description of the Prior Art

The increased popularity of utility vehicles has created a conflict between the aesthetic desires of the vehicle owner with the utilitarian structure of heavy duty components. Increasingly, hitches for towing trailers have become standard equipment on such utility vehicles. Alternatively, the hitch may be installed as an after-market item by a hitch manufacturer/distributor. A wellknown type of heavy duty trailer hitch is attached directly to the vehicle frame proximate the rear bumper. The hitch includes a crossbeam having end flanges for mounting to the frame and a hitch sleeve mounted to a midpoint of the crossbeam. A hitch ball is removably received within the hitch sleeve. Unfortunately, most of the hitch assembly is exposed to the rear of the vehicle detracting from the appearance of the vehicle.

In order to improve the appearance of the vehicle, manufacturers have integrated the hitch directly into the vehicle frame and bumper. The hitch ball extends through the bumper for connection to a trailer. However such hitch assemblies must be installed during manufacture of the vehicle providing no flexibility for the vehicle owners. Such bumper covers do not hide after-market hitches which are installed below the bumper.

Other hitch concealing assemblies include entire counterparts forming a part of bumper out of which the hitch may be pivotably deployed.

SUMMARY OF THE PRESENT INVENTION

The present invention overcomes the disadvantages of the prior known hitch housings by providing a decorative fascia easily mountable to the vehicle proximate the bumper for concealing the hitch assembly secured to the vehicle frame.

The typical hitch assembly, particularly hitches installed as an aftermarket accessory, include a crossbeam with end flanges for securing the assembly to the vehicle frame. A hitch sleeve, which receives the hitch ball, is secured to the crossbeam such that it is positioned at a midpoint below the bumper. The fascia of the present invention is designed to conceal the hitch assembly which can normally be seen beneath the rear bumper. The fascia mounts to the rear of the vehicle and matches the vehicle body so as to provide an integral appearance.

The fascia for the vehicle hitch includes a cover housing preferably constructed of a plastic which matches the exterior composition of the vehicle. End flanges attached to side walls of the cover mount the ends of the cover to the vehicle frame. Intermediate flanges secured to an intermediate portion of the cover attach the rear wall of the fascia to the hitch assembly. An upwardly extending tongue of the rear wall is attached directly to the bumper by appropriate fastening means.

The housing cover includes a removable or hinged door proximate the hitch sleeve. Access to the hitch sleeve is provided through the door allowing insertion of the hitch ball which then extends through the fascia. As a result, a trailer can be attached to the hitch ball while the hitch assembly conceals the hitch assembly mounted below the bumper.

Other objects, features and advantages of the invention will be apparent from the following detailed description taken in connection with the accompanying drawings.

BRIEF DESCRIPTION OF THE DRAWING

The present invention will be more fully understood by reference to the following detailed description of a preferred embodiment of the present invention when read in conjunction with the accompanying drawings, in which like reference characters refer to like parts throughout the view and in which.

DETAILED DESCRIPTION OF A PREFERRED EMBODIMENT OF THE PRESENT INVENTION

Figure 1:
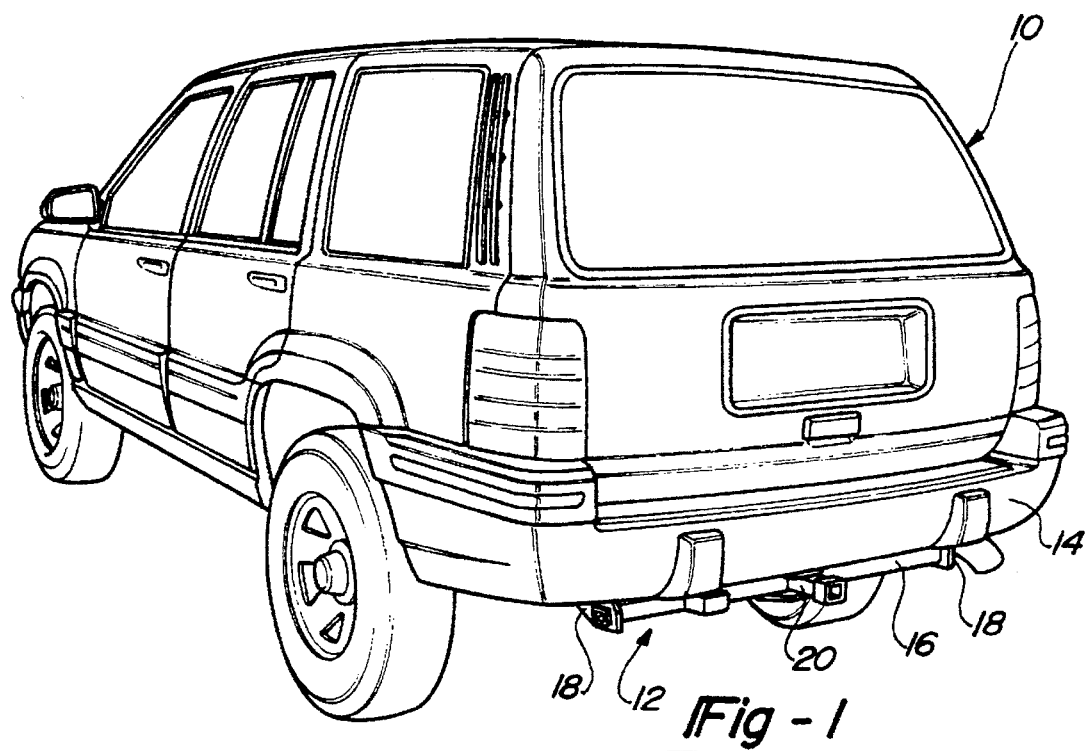
FIG. 1 is a perspective view of a vehicle incorporating a hitch assembly mounted to the rear of the vehicle.

Referring first to FIG. 1, there is shown a utility type vehicle 10 having a hitch assembly 12 mounted to the rear of the vehicle 10. The hitch assembly 12 is preferably mounted to the rear frame of the vehicle 10 such that it extends below the bumper 14 of the vehicle 10 for attaching a trailer (not shown). The hitch assembly 12 typically comprises a crossbeam 16 having end flanges 18 for securing the hitch assembly 12 to the vehicle 10. A hitch sleeve 20 is attached to the crossbeam 16 at a midpoint. The sleeve 20 extends rearwardly from the crossbeam 16 to removably receive a hitch ball 22 to which the trailer is attached. As can be seen in FIG. 1, a large portion of the hitch assembly 12 is disposed beneath the bumper 14 and therefore seen from the rear of the vehicle 10.

Figure 2:
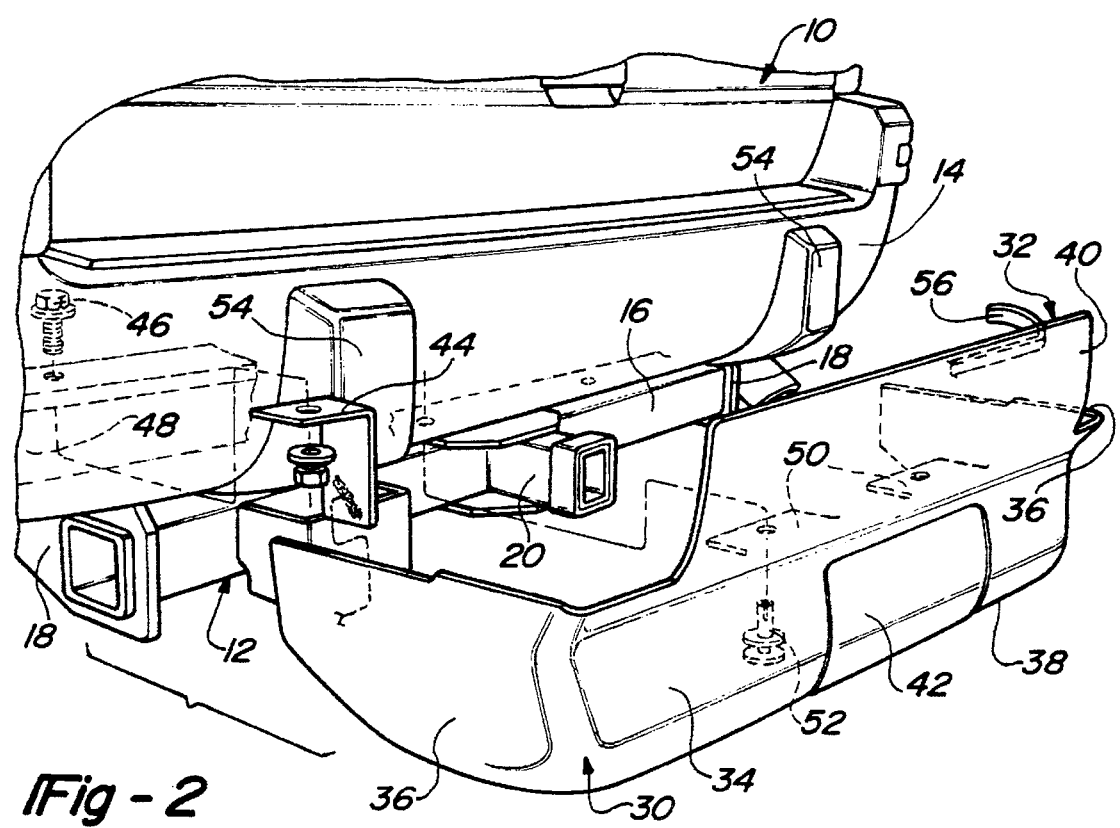
FIG. 2 is an enlarged perspective of the rear of the vehicle with a fascia cover of the present invention in exploded view.
Figure 3:
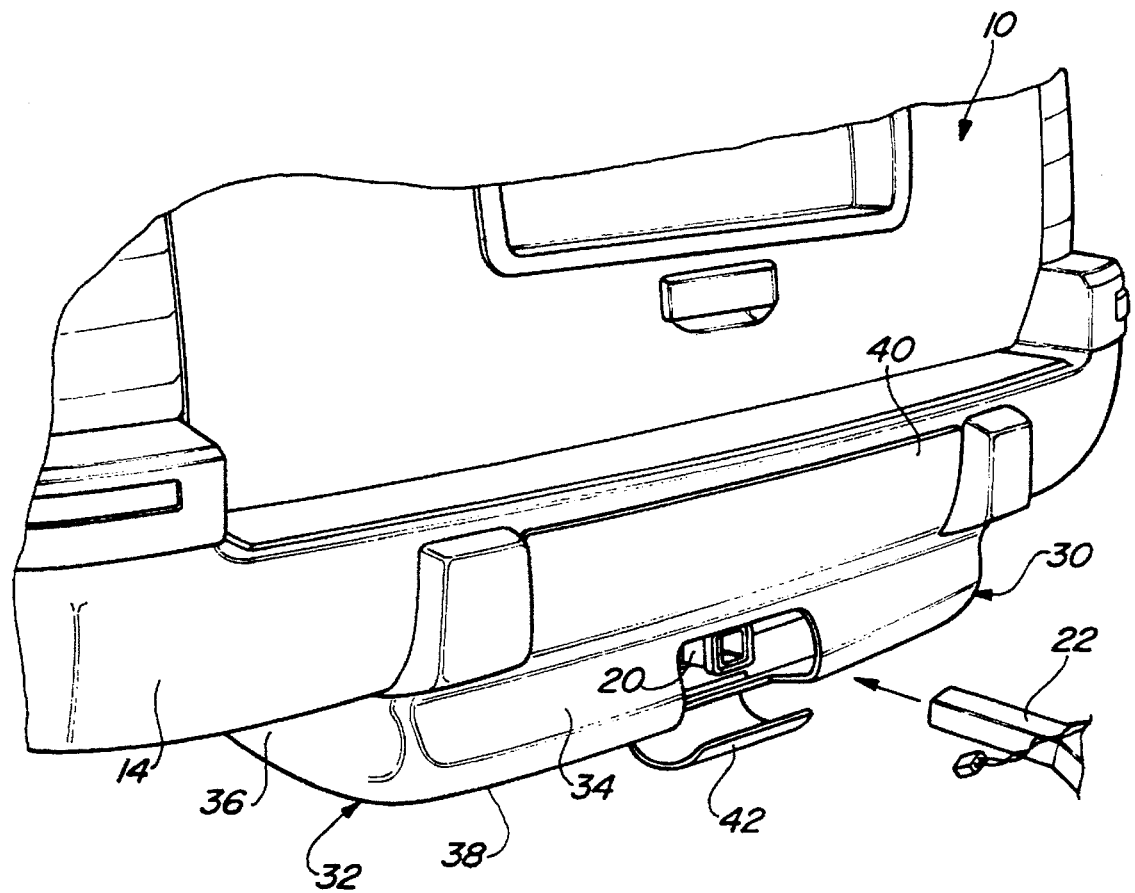
FIG. 3 is an enlarged perspective of the rear of the vehicle with the fascia cover mounted thereto to conceal the hitch assembly.

Referring now to FIGS. 2 and 3, the present invention comprises a fascia 30 for concealing the hitch assembly 12 disposed at the rear of the vehicle 10. The fascia 30 of the present invention conceals the hitch assembly 12 by mounting directly to the vehicle 10 but allows access to the hitch sleeve 20 as best shown in FIG. 3. The fascia 30 includes a shell 32 configured to fit against the bumper 14 around the hitch assembly 12. Accordingly, the specific configuration of the shell 32 will be determined by the vehicle model although basic configurations may be used on various vehicle types. The shell 32 is preferably a flexible plastic matching the color of the bumper and/or body paint. In a preferred embodiment, the shell 32 includes a rear wall 34, side walls 36 and at least a partial bottom wall or lip 38. Extending upwardly from the rear wall 34 is a tongue flap 40. Formed in the rear wall 34 of the shell 32 is a removable or pivotable door 42.

A series of flanges are utilized to mount the shell 32 to the vehicle 10. Secured to the side walls 36 are side flanges 44. Bolts 46 or other suitable fasteners are used to attach the side flanges 44 to a frame member 48 of the vehicle 10 thereby securing the ends of the fascia 30. At least one intermediate flange 50 is secured to the rear wall 34 of the shell 32 proximate a midpoint of the shell 32. In a preferred embodiment, the intermediate flange 50 is attached to the crossbeam 16 of the hitch assembly 12 using a rivet 52 or other suitable fastener. Alteratively, the intermediate flange 50 could be mounted to a frame member to secure the rear wall 34 of the fascia 30.

In accordance with the configuration of the bumper 14, the tongue flap 40 may extend the width of the rear wall 34 or may be shortened to fit between spaced pads 54 on the bumper as best shown in FIG. 3. As a means of securing the flap 40 to the bumper 14, two-sided tape 56 is applied to the flap 40 for adherence to the bumper 14. This prevents the tongue 40 from flapping in the wind while more completely enclosing the hitch assembly 12.

Thus, the present invention provides a separate component which may be installed as an aftermarket item in conjunction with installation of the hitch 12. This contrasts with prior art covers formed as a part of the vehicle body which must be installed during assembly of the vehicle 10 or require reconstruction of the vehicle. Once mounted to the vehicle 10 as shown in FIG. 3, the fascia 30 fully conceals the hitch assembly 12. The door 42 may be removed or pivoted to expose the hitch sleeve 20 facilitating insertion of a hitch ball or direct connection of the trailer. Upon decoupling, the door 42 can be closed to again to enclose the hitch assembly 12. In addition to improving the appearance of the vehicle 10 by concealing the hitch assembly 12, the fascia 30 protects the hitch assembly 12 from the elements preserving the life of the hitch 12.

The foregoing detailed description has been given for clearness of understanding only and no unnecessary limitations should be understood therefrom as some modifications will be obvious to those skilled in the art without departing from the scope and spirit of the appended claims.

What is claimed is:

1. A fascia for concealing a hitch assembly on a vehicle, the hitch assembly mounted beneath a rear bumper of the vehicle for selective connection to a trailer, said fascia comprising:

a cover having a rear wall and laterally spaced ends, said cover having a width greater than the hitch assembly to conceal the hitch assembly upon mounting said cover to the vehicle; and fastening means for mounting said cover proximate the rear bumper of the vehicle such that the hitch assembly is concealed.

2. The fascia as defined in claim 1 and further comprising a door mounted in said rear wall of said cover for selective access to the hitch assembly for connection of the trailer.

3. The fascia as defined in claim 2 wherein said cover includes laterally spaced end walls extending from said rear wall, said end walls having first mounting brackets for fastening said cover to the vehicle.

4. The fascia as defied in claim 3 wherein said fastening means further comprises a second mounting bracket attached to said rear wall for fastening said cover to the vehicle.

5. The fascia as defined in claim 3 wherein said rear wall includes an upwardly extending tongue flap, said tongue flap having means for attaching said flap to the rear bumper of the vehicle.

6. A fascia for concealing a hitch assembly on a vehicle, the hitch assembly mounted beneath a rear bumper of the vehicle for selective connection to a trailer, said fascia comprising:

a cover having a rear wall and laterally spaced end walls, said cover having a width greater than the hitch assembly such that said end walls extend around the ends of the hitch assembly to conceal the hitch assembly upon mounting said cover to the vehicle, said cover including a tongue flap extending upwardly from said rear wall for selective engagement with the rear bumper;

first fastening means attached to said end walls of said cover for securing said end walls to the vehicle and second fastening means attached to said rear wall of said cover for securing said rear wall to the vehicle; and a door mounted in said rear wall of said cover for selective access to the hitch assembly for connection of the trailer;

whereby said fascia is selectively mounted to the vehicle proximate the rear bumper with said tongue flap engaging the rear bumper to conceal the hitch assembly from view from a rear perspective of the vehicle and said door facilitates selective access to the hitch assembly.

7. The fascia as defined in claim 6 wherein said door is pivotably attached to said rear wall of said cover such that said door may be pivotably opened for access to the hitch assembly.

8. The fascia as defined in claim 6 wherein said door is removably attached to said rear wall of said cover such that said door may be removed for access to the hitch assembly.

9. The fascia as defined in claim 6 wherein said first fastening means includes a flange bracket secured to said end walls and a fastener for mounting said end flange brackets to the vehicle.

10. The fascia as defined in claim 6 wherein said second fastening means includes at least one flange bracket secured to said rear wall and a fastener for mounting said at least one rear flange bracket to the vehicle.

11. A fascia for concealing a hitch assembly on a vehicle, the hitch assembly mounted beneath a rear bumper of the vehicle for selective connection to a trailer, said fascia comprising:

a cover having a rear wall with a tongue flap extending upwardly therefrom and laterally spaced end walls, said cover having a width greater than the hitch assembly such that said side walls extend around the ends of the hitch assembly and said tongue flap extending upwardly to engage the rear bumper thereby concealing the hitch assembly upon mounting said cover to the vehicle;

first fastening means attached to said end walls of said cover for securing said end walls to the vehicle;

second fastening means attached to said rear wall of said cover for securing said rear wall to the vehicle;

third fastening means for attaching said tongue flap to the rear bumper of the vehicle; and a door mounted in said rear wall of said cover for selective access to the hitch assembly for connection of the trailer;

whereby said fascia is selectively mounted to the vehicle proximate the rear bumper to conceal the hitch assembly from view from a rear perspective of the vehicle and said door facilitates selective access to the hitch assembly.

12. The fascia as defined in claim 11 wherein said door is pivotably attached to said rear wall of said cover such that said door may be pivotably opened for access to the hitch assembly.

13. The fascia as defined in claim 11 wherein said door is removably attached to said rear wall of said cover such that said door may be removed for access to the hitch assembly.

14. The fascia as defined in claim 11 wherein said first fastening means includes a flange bracket secured to said end walls and a fastener for mounting said end flange brackets to the vehicle.

15. The fascia as defined in claim 6 wherein said second fastening means includes at least one flange bracket secured to said rear wall and a fastener for mounting said at least one rear flange bracket to the vehicle.

16. A fascia for concealing a hitch assembly on a vehicle, the hitch assembly mounted beneath a rear bumper of the vehicle for selective connection to a trailer, said fascia comprising:

a cover having a rear wall with a tongue flap extending upwardly therefrom and laterally spaced end walls, said cover having a width greater than the hitch assembly such that said side walls extend around the ends of the hitch assembly and said tongue flap extending upwardly to engage the rear bumper thereby concealing the hitch assembly upon mounting said cover to the vehicle;

first fastening means attached to said end walls of said cover for securing said end walls to the vehicle, said first fastening means including a flange bracket secured to said end walls and a fastener for connecting said end flange brackets to the vehicle;

second fastening means attached to said rear walls of said cover for securing said rear wall to the vehicle, said second fastening means including at least one flange bracket secured to said rear wall and a fastener for connecting said at least one rear flange bracket to the vehicle;

third fastening means for attaching said tongue flap to the rear bumper of the vehicle; and a door mounted in said rear wall of said cover for selective access to the hitch assembly for connection of the trailer;

whereby said fascia is mounted to the vehicle proximate the rear bumper to conceal the hitch assembly from view and said door facilitates selective access to the hitch assembly.

17. The fascia as defined in claim 16 wherein said door is pivotably attached to said rear wall of said cover such that said door may be pivotably opened for access to the hitch assembly.

18. The fascia as defined in claim 16 wherein said door is removably attached to said rear wall of said cover such that said door may be removed for access to the hitch assembly.

* * * * *